United States Patent [19]

Rosen

[11] Patent Number: 5,525,136

[45] Date of Patent: Jun. 11, 1996

[54] GASKETED MULTI-MEDIA AIR CLEANER

[76] Inventor: Richard M. Rosen, 5730 NW. 60th Pl., Parkland, Fla. 33067

[21] Appl. No.: 301,111

[22] Filed: Sep. 6, 1994

[51] Int. Cl.$^6$ .................................................. B01D 46/12
[52] U.S. Cl. ..................... 55/486; 55/502; 55/524; 55/527; 55/DIG. 24; 55/DIG. 31; 55/DIG. 39
[58] Field of Search ........................... 55/524, 527, 522, 55/485, 486, 482, 504, 502, 507, 511, DIG. 31, DIG. 39, DIG. 24

[56] References Cited

U.S. PATENT DOCUMENTS

| | | | |
|---|---|---|---|
| 2,145,898 | 2/1939 | Simpson | 55/524 |
| 2,751,039 | 6/1956 | Hanly | 55/524 |
| 2,827,395 | 3/1958 | Jordan et al. | 55/524 |
| 3,201,926 | 8/1965 | Harrington | 55/486 |
| 3,763,633 | 10/1973 | Soltis | 55/486 |
| 4,518,402 | 5/1985 | Dargel | 55/485 |
| 4,610,705 | 9/1986 | Sarnosky et al. | 55/485 |
| 4,902,306 | 2/1990 | Burnett et al. | 55/486 |
| 4,917,942 | 4/1990 | Winters | 55/486 |
| 5,183,488 | 2/1993 | Deering | 55/486 |
| 5,419,953 | 5/1995 | Chapman | 55/486 |

*Primary Examiner*—Jay H. Woo
*Assistant Examiner*—Duane S. Smith
*Attorney, Agent, or Firm*—Malin, Haley, DiMaggio & Crosby

[57] ABSTRACT

An air cleaner incorporating a plurality of filtration techniques within a rigid, gasketed frame designed to fit in conventional filter tracks. A perimeter gasket attached to the frame leaving air side provides a positive seal thereby preventing air from bypassing the frame. The frame houses, in series from the entering air side, a replaceable dry-type media filter coated on its leaving air side with a viscous substance, and a synthetic weave having a charge separation producing local electrostatic effects. The replaceable media effectively comprises two stages of filtration; dry-type media filtration, and viscous impingement filtration. Air passing through the instant filtration configuration is efficiently cleaned with little resistance.

5 Claims, 2 Drawing Sheets

GASKETED MULTI-MEDIA AIR CLEANER

BACKGROUND OF THE INVENTION

1. Field of the Invention

The present invention relates to air filtration devices, and more particularly to a low cost and efficient air filtration unit incorporating a gasketed frame housing a plurality of filtration methods.

2. Description of the Prior Art

ATMOSPHERIC DUST

Atmospheric dust is a complex mixture of smoke, fumes, dry granular particles, and fibers. These components and their concentrations vary with the geography of the locality (urban or rural), the season of the year, weather, the direction and strength of the wind, and the proximity of dust sources. A sample of atmospheric dust usually contains soot and smoke, silica, clay, decayed animal and vegetable matter, organic materials in the form of lint and plant fibers, and metallic fragments. It may also contain living organisms, such as mold spores, bacteria, and plant pollens, which may cause diseases or allergic responses.

Particles in the atmosphere range in size from less than 0.01 pica meters to the dimensions of lint, leaves, and insects. Particulate contamination indoors is influenced by smoking, human sources, human activities, and other sources such as equipment, furnishings and pets.

AIR FILTRATION

Different applications require different degrees of air filtration. In industrial ventilation, it may only be necessary to remove the coarser dust particles from the airstream so as to remove coarse dust particles from the airstream in order to insure the protection of mechanical equipment and cleanliness of the structure. A residential application, on the other hand, may require removal of even finer dust particles, often the worst offenders of home interior discoloration. Electronic air cleaners or high efficiency media filters may be required for small particle removal, specifically the respirable fraction, which often just be controlled for health reasons.

The characteristics of airborne contaminants most affecting the performance of an air filter include particle specific gravity, concentration, electrical properties, and most importantly, size. Thus, the degree of air cleanliness required and contaminant concentration are major factors influencing filter design and selection.

Three operating characteristics distinguish the various types of air filters: efficiency, airflow resistance, and dust holding capacity. Efficiency measures the ability of an air filter to remove particulate matter from an airstream. Airflow resistance is the static pressure drop across the filter at a given airflow rate. Dust holding capacity defines the amount of a particular type of dust that an air cleaner can hold when it is operated at a specified airflow rate to some maximum resistance value or before its efficiency drops seriously as a result of the collected dust. Complete evaluation of an air filter thus requires data on all of the aforementioned factors.

The American Society of Heating, Refrigerating and Air Conditioning Engineers (ASHRAE) has developed testing methods for determining air filter efficiency that have become standard in general ventilation applications in the United States. These testing techniques have been unified into a single test procedure, ASHRAE Standard 52–76, recently renamed as ASHRAE Standard 52.1-1992. In this procedure a known amount of standardized test dust is fed into a test filter at a known and controlled rate. The concentration of dust in the air leaving the filter is determined by then passing the entire airflow through a high efficiency after-filter and measuring the gain in filter weight. In the ASHRAE Standard 52.1-1992, Dust Holding Capacity Test, the same test dust is fed to the filter, and the pressure drop across the filter rises as dust is collected by the filter. The test is terminated when the pressure drop across the filter reaches the maximum operating resistance set by the manufacturer.

A variety of filter configurations known in the art are routinely tested and rated according to ASHRAE Standard 52.1-1992. Among these types of filters are panel filters, renewable media filters, and electronic or electrostatic air cleaners. Panel filters consist of viscous impingement filters and conventional dry type filters. Viscous impingement filters are panel filters where the filter media is coated with a viscous substance, such as oil, which adheres to particles that impinge on the fibers. Renewable media filters are found exclusively in commercial and industrial applications; while dry-type panel filters and to a lesser extent electronic air cleaners are primarily used in residential applications.

Filters commonly used in residential applications are often inefficient, low cost filters purchased from a local hardware store. These filters generally consist of a cardboard frame housing fiber mats or blankets of varying thickness, fiber sizes, and densities. Manufacturers recommend changing these filters regularly, however, homeowners rarely follow such recommendations. As a result, particulate buildup on the filter increases thereby increasing the pressure drop or resistance across the filter. When this occurs the airflow naturally seeks the path of least resistance. Since the thin cardboard filter frames provide a poor perimeter seal, when the resistance increases, air tends to leak around the frame edges thereby completely avoiding filtration.

Another problem associated with these low cost filters involves the ability of the filter media to retain collected dust. As filter media loads up with dust and other contaminants, the available free area for accommodating air flow decreases thereby increasing the velocity of a given quantity of airflow forced to pass through the reduced area. The resulting high air velocity causes accumulated dust to blow off and re-enter the airstream thereby reducing filter efficiency. In addition, the blow off reduces air conditioning efficiency by building up on the downstream evaporator coil thereby increasing operating costs. Furthermore, the blow off decreases mechanical equipment life and causes untimely breakdowns.

While the aforementioned problems can be overcome by expensive highly engineered, industrial filtration systems and intense maintenance, there exists a need for an improved residential and light commercial filter having a durable gasketed frame incorporating, in combination, conventional dry filter media, viscous impingement media, and an electrostatic filtration assembly, in a compact low cost unit. It is, therefore, to the effective resolution of the aforementioned problems and shortcomings that the present invention is directed.

SUMMARY OF THE INVENTION

The instant invention contemplates a low cost, efficient, air filtration unit incorporating a plurality of filtration methods in series configuration for optimum filtration performance and low resistance. The invention comprises: a rigid frame custom fabricated and sized for a conventional air handling unit filter track, a gasket attached to the frame for providing a seal to prevent air bypass, a conventional replaceable dry-type filter media, viscous impingement media, and an electret or electrostatic filter, arranged in series.

In a preferred embodiment, the instant invention comprises a filter media holding frame constructed of aluminum or rigid PVC. The frame has a foam rubber gasket to provide a positive seal thereby preventing air bypass.

The filter frame houses, in series, a throw-away synthetic fibrous filter media, having a leaving air side coated with a viscous substance such as oil, and an electret filter composed of electrostatically charged fibers for augmenting the collection of smaller particles with Coulombic forces caused by the charges on the fibers.

In accordance with the present invention, it is an object thereof to provide a efficient, low cost, air filter for use in a ducted air stream.

An additional object of the instant invention is to provide an efficient air filter having a gasketed frame to prevent air bypass.

A further object of the instant invention is to provide a novel filter arrangement that combines the benefits of dry type media, viscous impingement media and electrostatic filtration in a single gasketed filter frame for residential and light commercial use.

Still another object of the instant invention is to provide the aforementioned filter configuration in a filter frame that fits in an industry standard 1-inch deep filter track.

A further object of the present invention is to provide the aforementioned filter configuration whereby a single replaceable fiber mat incorporates both dry-type and viscous impingement filtration methods.

In accordance with these and other objects which will become apparent hereinafter, the instant invention will now be described with particular reference to the accompanying drawings.

DESCRIPTION OF THE PREFERRED EMBODIMENTS

Figure 1:
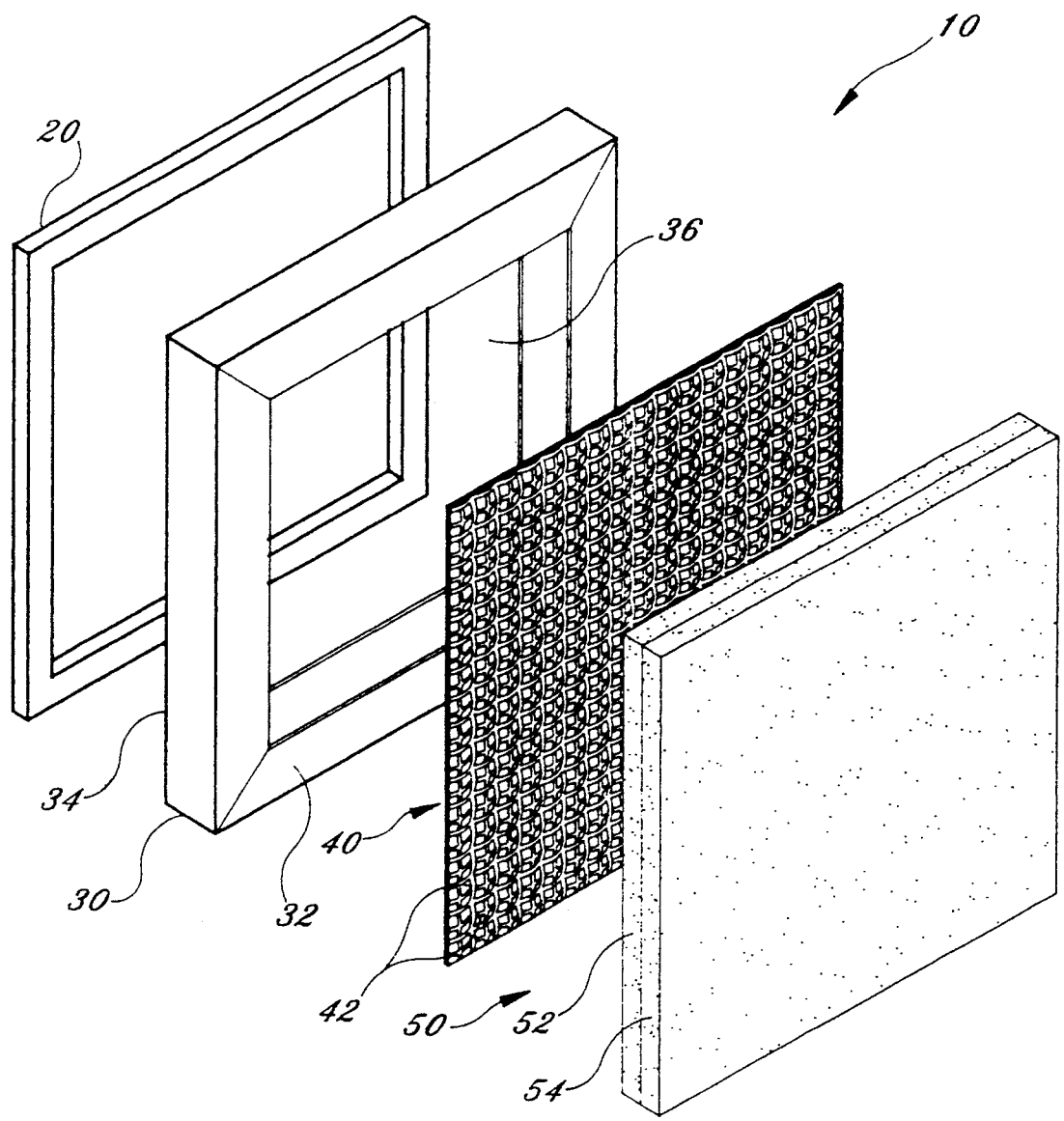
FIG. 1 depicts an exploded view detailing the series configuration contemplated by the instant invention.
Figure 2:
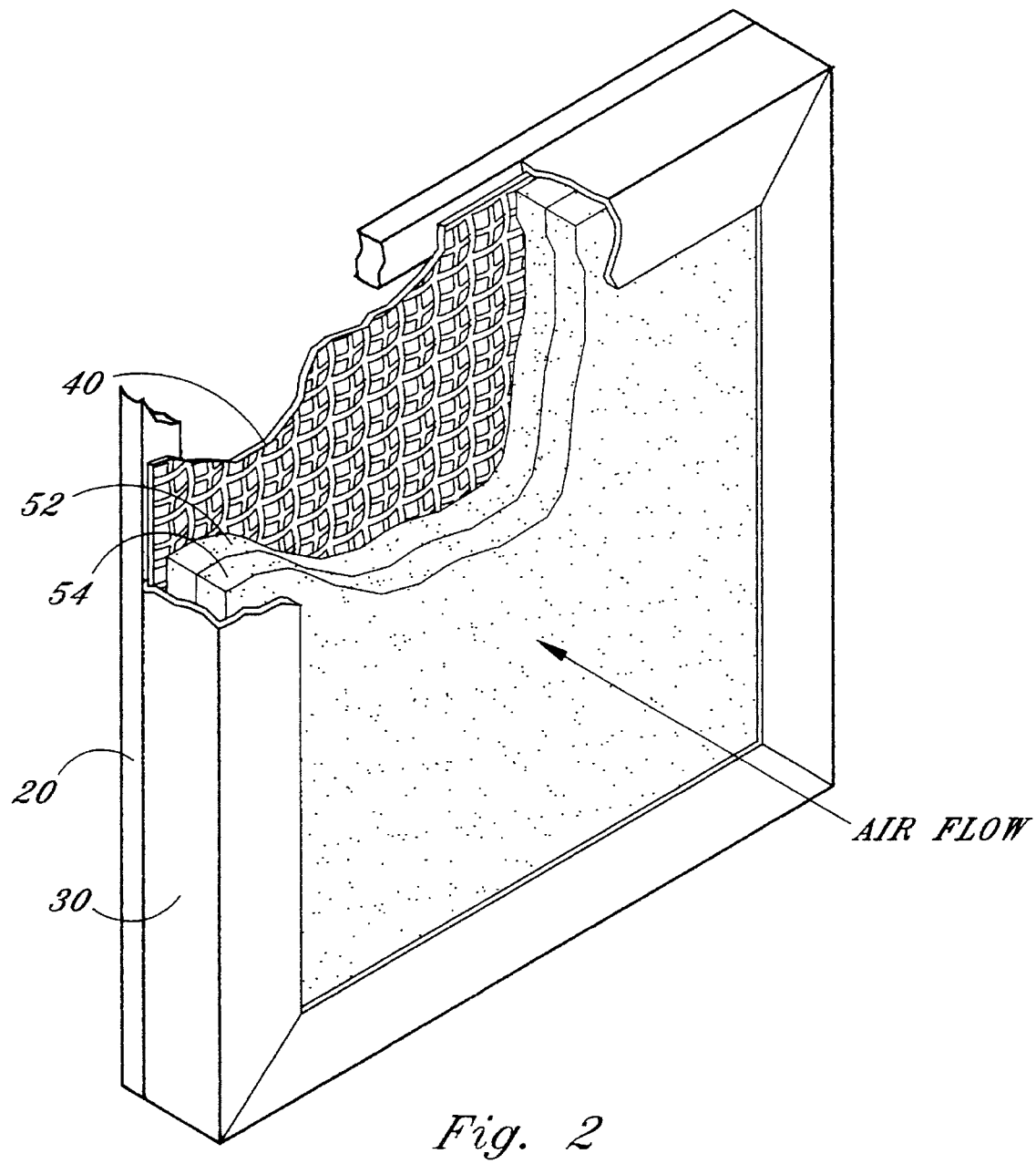
FIG. 2 depicts a partially cutaway perspective view of an assembled filter.

Turning now to the drawings, FIG. 1 depicts an embodiment of the instant invention, generally designated 10. The invention comprises: a gasket 20, attached to a rigid frame 30, housing an electrostatic filter 40, and a replaceable filter media 50, arranged in series.

In a preferred embodiment, the instant invention comprises a filter media holding frame 30 constructed of aluminum or rigid PVC. Frame 30 has an entering-air side 32 and a leaving air side 34, and is generally rectangular and sized and custom manufactured for a particular air handling unit filter track or return air grill. Frame 30 defines a filtration face area 36. Face area 36 is sized relative to the quantity of air, usually expressed in cubic feet per minute (CFM), to be filtered. Face area 36 is generally sized such that the air flow velocity is between 400 and 600 feet per minute. Typically, installing the instant invention 10 merely requires a user to slide frame 30 into a mating filter track (not shown).

Frame 30 incorporates a perimeter gasket 20 for providing a positive air seal. Gasket 20 may be fabricated from foam rubber, or any other suitable gasket material. Gasket 20 is located on the leaving air side 34 of frame 30 and attached so as to prevent air from bypassing filtration by leaking around the frame perimeter. Attaching gasket 20 to leaving air side 34 insures that airflow passing through the filter media, and corresponding pressure differential, combine to force gasket 20 in contact with the supporting filter track thereby maintaining a positive seal. In other contemplated embodiments, however, it may be desirable to mount gasket 20 on the entering air side of frame 30 or on the frame perimeter.

Frame 30 houses, in series from entering-air side 32, a throw-away fibrous media filter 50, and an electrostatic filter 40 composed of electrostatically charged fibers for augmenting the collection of smaller particles with Coulombic forces caused by the charges on the fibers.

Filter 50 is typically comprised of a fiber media mat. Media of bonded glass fiber, cellulose fibers, wool felt, or synthetics may be used. Fiber media mat 50 has an entering air face 54 and a leaving air face 52. For optimum efficiency, fiber media mat 50 may be designed with fibers packed more densely on the leaving air face 52 than on the entering air face 54; thereby permitting both the accumulation of larger particles and lint near the air-entering face of the filter and the filtration of finer particles on the more closely packed air-leaving face.

Filter 50 also comprises a viscous impingement filter. In the preferred embodiment, filter media 50 has a leaving air face 52 coated with a viscous substance, such as oil, which adheres to particles that impinge on the fibers thereby retaining the particles. The viscous impingement filter efficiency and dust holding capacity depend on the specific type and quantity of adhesive used. It has been found that coating fibrous media 50 with oil, such as vegetable oil, results in optimum performance; however the specific substance may be tailored for specific particulate. At design airflow rates, fibrous media filter 50 has an initial resistance, or static pressure drop across the filter of approximately 0.05–0.10 inches of water.

Electrostatic filter 40 is composed of a mat of synthetic fibers 42 that are either produced with an inherent electrostatic charge or develop a charge as a result of friction produced by airflow. Electrostatic fibers 42 may be produced such that during production, a corona discharge injects positive charges on one side of a thin polypropylene film and negative charges on the opposite side. The polypropylene sheet is then shredded into fibers. The efficiency of the charged fiber electrostatic filter 40 is due to both the normal collection mechanisms of a media filter and the strong local electrostatic effects which induce efficient preliminary loading of positively charged particles thereby enhancing the caking process. At design airflow rates, electrostatic filter 40 has an initial resistance, or static pressure drop across the filter of approximately 0.05–0.10 inches of water.

The present invention contemplates custom fabricating frame 30 to the exact dimensions, within accepted tolerances, of a user's filter frame. Since air conditioning equipment supplier's methods of manufacturing differ substantially, resulting in wide ranging dimensional tolerances, it is believed that only custom filter frame fabrication will yield a suitable seal thereby maximizing filter efficiency. Once fabricated, frame 30 is equipped with sealing gasket 20, which is bonded using a non-off gassing adhesive. Next, electrostatic filter media 40 is secured such that it is housed within frame 30, and positioned proximate the leaving air side 34. A fibrous mat 50 is then cut to the proper dimensions so as to fit within frame 30. A viscous substance, such as oil, is then applied to mat 50 on what will be the leaving air side, and mat 50 is installed within frame 30. The completed filter assembly is then installed in a filter track in a conventional manner. When fully loaded with particulate, the instant invention is removed from its supporting filter track. Fibrous mat 50 is then easily removed and discarded, and electret filter 40 may be cleaned with soap and water. A replacement fibrous mat is then installed and the assembly replaced.

The filter assembly of the present invention has been tested according to ASHRAE 52–76 with the following results: Initial resistance of 0.17-inch Water gauge at 1200 CFM, Synthetic Dust Weight Arrestance of 90.1%, and Dust Holding Capacity of 206 grams at 1-inch.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A multi-media air cleaning device for mounting in a filter track in a ducted airstream comprising:

a frame, said frame defining an opening for housing filter media, and having an entering air side and a leaving air side;

gasket means for providing a positive seal and preventing said airstream from bypassing said frame opening, said gasket means connected to said frame leaving air side periphery such that the pressure differential on opposing sides of said frame maintains a positive seal between said frame leaving air side and said filter mounting track;

said gasket means comprising a sealing strip attached to said frame leaving air side whereby said sealing strip is interposed between said filter track and said frame leaving air side;

a fibrous filter media removably housed within said frame, said media having a first, entering air, side and a second, leaving air, side;

said media first side comprising a filter for accumulating airborne particles;

said media second side coated with a viscous substance, and comprising a viscous impingement filter for accumulating airborne particles; and a synthetic weave filter media disposed on said frame leaving air side, said synthetic weave filter media being fabricated from synthetic fibers having an electrostatic charge for accumulating airborne particulates.

2. An air cleaning device according to claim 1, wherein said synthetic weave filter media develops an electrostatic charge results from frictional forces generated by an airstream.

3. An air cleaning device according to claim 1, wherein said synthetic weave filter media is fabricated from synthetic fibers having an inherent electrostatic charge whereby strong local electrostatic effects induce efficient preliminary loading of positively charged particles thereby enhancing the caking process.

4. An air cleaning device according to claim 1, wherein said fibrous filter media comprises a fiber mat having a higher density of fibers on said first side than on said second side, said first side corresponding to an upstream side and said second side corresponding to a downstream side, for the accumulation of larger airborne particles proximate said first side and the accumulation of smaller airborne particles proximate said second side.

5. A multi-media air cleaning device for mounting in a filter track in a ducted airstream comprising:

a substantially rectangular frame, said frame defining an opening for housing filter media, and having an entering air side and a leaving air side;

a gasket connected to said frame leaving air side for providing a positive seal and preventing portions of said airstream from bypassing said frame opening, said gasket connected to said frame leaving air side periphery such that the pressure differential on opposing sides of said frame maintains a positive seal between said frame leaving air side and said filter mounting track;

a fibrous filter media removably housed within said frame, said media having an entering air side and a leaving air side;

said media entering air side comprising a filter for accumulating airborne particles;

said media leaving air side coated with a viscous substance, and comprising a viscous impingement filter for accumulating airborne particles; and a synthetic weave filter media disposed on said frame leaving air side and connected thereto, said synthetic weave filter media being fabricated from synthetic fibers and having an electrostatic charge for accumulating airborne particulates.

* * * * *